United States Patent
Zhang et al.

(10) Patent No.: US 8,411,934 B2
(45) Date of Patent: Apr. 2, 2013

(54) SYSTEM AND METHOD FOR DEPTH MAP EXTRACTION USING REGION-BASED FILTERING

(75) Inventors: Dong-Qing Zhang, Plainsboro, NJ (US); Izzat Izzat, Plainsboro, NJ (US)

(73) Assignee: Thomson Licensing, Boulogne-Billancourt (FR)

( * ) Notice: Subject to any disclaimer, the term of this patent is extended or adjusted under 35 U.S.C. 154(b) by 219 days.

(21) Appl. No.: 12/741,872

(22) PCT Filed: Nov. 9, 2007

(86) PCT No.: PCT/US2007/023632
§ 371 (c)(1),
(2), (4) Date: Jul. 9, 2010

(87) PCT Pub. No.: WO2009/061305
PCT Pub. Date: May 14, 2009

(65) Prior Publication Data
US 2011/0044531 A1 Feb. 24, 2011

(51) Int. Cl.
*G06K 9/62* (2006.01)

(52) U.S. Cl. ........................................................ 382/154

(58) Field of Classification Search .......... 382/103–104, 382/106–107, 153–154, 164, 173, 181, 190, 382/201, 218, 224–225, 285, 291; 348/42, 348/47–48, 119, 139; 345/419, 634; 342/90; 356/12
See application file for complete search history.

(56) References Cited

U.S. PATENT DOCUMENTS 6,351,572 B1 * 2/2002 Dufour .......................... 382/285
6,556,704 B1 * 4/2003 Chen ............................. 382/154
6,674,877 B1 * 1/2004 Jojic et al. ..................... 382/103
(Continued)

FOREIGN PATENT DOCUMENTS

JP 61286979 12/1986
JP 64073474 3/1989
(Continued)

OTHER PUBLICATIONS

Kauff, P. et al., Depth Map Creation and Image-Based Rendering for Advanced 3DTV Services Providing Interoperability and Scalability, Signal Processing, Image Communication, Elsevier Science Publishers Amsterdam , NL, vol. 22 No. 2, Mar. 16, 2007, pp. 217-234, XP005938670, ISSN: 0923-5965.

(Continued)

*Primary Examiner* — Jose Couso
(74) *Attorney, Agent, or Firm* — Robert D. Shedd; Vincent E. Duffy; James McKenzie

(57) ABSTRACT

A system and method for extracting depth information from at least two images employing region-based filtering for reducing artifacts are provided. The present disclosure provides a post-processing algorithm or function for reducing the artifacts generated by scanline Dynamic Programming (DP) or other similar methods. The system and method provides for acquiring a first image and a second image from a scene, estimating the disparity of at least one point in the first image with at least one corresponding point in the second image to generate a disparity map, segmenting at least one of the first or second images into at least one region, and filtering the disparity map based on the segmented regions. Furthermore, anisotropic filters are employed, which have a great smoothing effect along the vertical direction than that of the horizontal direction, and therefore, reduce stripe artifacts without significantly blurring the depth boundaries.

12 Claims, 4 Drawing Sheets

U.S. PATENT DOCUMENTS

| | | | |
|---|---|---|---|
| 7,167,595 | B2 | 1/2007 | Hiroshige et al. |
| 7,586,489 | B2 * | 9/2009 | Muller-Fischer et al. .... 345/427 |
| 8,170,324 | B2 * | 5/2012 | Cho et al. ................. 382/153 |
| 2009/0188746 | A1 | 7/2009 | Yamada et al. |

FOREIGN PATENT DOCUMENTS

| | | |
|---|---|---|
| JP | 05268587 | 10/1993 |
| JP | 06259547 | 9/1994 |
| JP | 11007531 | 1/1999 |
| JP | 2002077942 | 3/2002 |
| JP | 2003061105 | 2/2003 |
| JP | 2004214756 | 7/2004 |
| JP | 2006012166 | 1/2006 |
| JP | 2006033346 | 2/2006 |
| JP | 2006509211 | 3/2006 |
| JP | 2006350465 | 12/2006 |
| WO | 0205544 | 1/2002 |
| WO | 200613700 | 12/2006 |

OTHER PUBLICATIONS

Izquierdo, E., et al: Nonlinear Gaussian Filtering Approach for Object Segmentation, Jul. 23, 1998 IEE Procedings: Vision, Image and Signal Processing, Institution of Electrical Engineers, GB, vol. 46, No. 3, p. 138, col. 1, Para 2-p. 140, col. 1, last para; Figures 6&10 Relevant to Claims 1,3-6,11,13-16, 21.

Jens-Rainer Ohm, et al: "An Object-Based System for Stereoscopic Viewpoint Synthesis" IEEE Transactions on Circuits and System for Video Technology, IEEE Serv. Ctr, Piscataway, NY, US, vol. 7, No. 5, Oct. 1, 1997, XP011014423 ISSN: 1051-8215 The whole document, Claims 1,11 & 21.

Search Report dtd Dec. 8, 2008.

* cited by examiner 2D image

Depth map with stripe artifacts by scanline dynamic programming

Region segmentation result

Smoothed depth map

SYSTEM AND METHOD FOR DEPTH MAP EXTRACTION USING REGION-BASED FILTERING

This application claims the benefit under 35 U.S.C. §365 of International Application PCT/US2007/023632, filed Nov. 9, 2007, which was published in accordance with PCT article 21(2) on May 14, 2009, in English.

TECHNICAL FIELD OF THE INVENTION

The present disclosure generally relates to computer graphics processing and display systems, and more particularly, to a system and method for extracting depth information from at least two images employing region-based filtering for reducing artifacts.

BACKGROUND OF THE INVENTION

Stereoscopic imaging is the process of visually combining at least two images of a scene, taken from slightly different viewpoints, to produce the illusion of three-dimensional depth. This technique relies on the fact that human eyes are spaced some distance apart and do not, therefore, view exactly the same scene. By providing each eye with an image from a different perspective, the viewer's eyes are tricked into perceiving depth. Typically, where two distinct perspectives are provided, the component images are referred to as the "left" and "right" images, also know as a reference image and complementary image, respectively. However, those skilled in the art will recognize that more than two viewpoints may be combined to form a stereoscopic image.

In 3D post-production, visual effects ("VFX") workflow and three-dimensional ("3D") display applications, an important process is to infer or extract depth information, e.g., a depth map or distance from object to camera, from stereoscopic images consisting of left eye view and right eye view images. Depth map extraction can be used in a variety of film applications, for instance, acquiring the geometry of a scene for film postproduction, depth keying, 3D compression and content generation for 3D displays. For instance, recently commercialized autostereoscopic 3D displays require an image-plus-depth-map input format (2D+Z), so that the display can generate different 3D views to support multiple viewing angles.

Stereo matching is a widely used approach for depth map extraction to estimate depth maps from two images taken by cameras at different locations. Stereo matching obtains images of a scene from two or more cameras positioned at different locations and orientations in the scene. These digital images are obtained from each camera at approximately the same time and points in each of the images are matched corresponding to a 3-D point in space. In general, points from different images are matched by searching a portion of the images and using constraints (such as an epipolar constraint) to correlate a point in one image to a point in another image. Depth values are inferred from the relative distance between two pixels in the images that correspond to the same point in the scene.

A variety of methods have been developed for accurate depth estimation, for instance, dynamic programming, belief propagation, simple block matching, etc. More accurate methods are usually more computationally expensive. Some of the methods are too slow to be useful for practical applications. Scanline algorithms (e.g., scanline dynamic programming or scanline belief propagation) have been found to be relatively efficient algorithms or functions able to give quite accurate results, compared to simple pixel/block matching (too inaccurate) and two-dimensional ("2D") belief propagation (too slow). Therefore, scanline algorithms or functions could become practical solutions for depth estimation problems. However, the main drawback of the scanline algorithms or functions is that the scanline algorithms or functions often yield horizontal stripe artifacts (see FIG. 5B where stripe artifacts are encircled), because unlike other expensive algorithms such as belief propagation, scanline algorithms only perform optimization one scanline at a time, consequently smoothness constraints are not imposed along vertical directions.

Therefore, a need exists for techniques for fast and efficient depth information extraction methods that minimize discontinuity or stripe artifacts.

SUMMARY

A system and method for extracting depth information from at least two images employing region-based filtering for reducing artifacts are provided. The present disclosure provides a post-processing algorithm or function for reducing the artifacts generated by scanline Dynamic Programming (DP) or other similar methods. The system and method segment at least one of the two images by region segmentation algorithms or functions, and perform filtering without crossing the segmented region boundary. Furthermore, anisotropic filters are employed, which have more filter strength along the vertical direction than that of the horizontal direction, and therefore, reduce stripe artifacts without significantly blurring the depth boundaries.

According to one aspect of the present disclosure, a method of extracting depth information from at least two images is provided. The method includes acquiring a first image and a second image from a scene, estimating the disparity of at least one point in the first image with at least one corresponding point in the second image to generate a disparity map, segmenting at least one of the first or second images into at least one region, and filtering the disparity map based on the segmented regions. In one aspect, the first and second images include a left eye view and a right eye view of a stereoscopic pair.

In another aspect, the method includes converting the filtered disparity map into a depth map by inverting the estimated disparity for each of the at least one point of the disparity map.

In a further aspect, the estimating the disparity step is preformed by a scanline optimization function.

In another aspect, the filtering step includes filtering at least one pixel of the disparity map in the horizontal direction, and filtering the at least one pixel of the disparity map in the vertical direction, wherein the filtering in the vertical direction is configured to have a greater smoothing effect than filtering in the horizontal direction.

In still a further aspect, the filtering step includes selecting a filter size, creating a mask block sub-image based on the filter size to mask pixels outside the at least one segmented region, and filtering at least one pixel inside the at least one segmented region.

According to another aspect of the present discourse, a system for extracting depth information from at least two images includes means for acquiring a first image and a second image from a scene, a disparity estimator configured for estimating the disparity of at least one point in the first image with at least one corresponding point in the second image to generate a disparity map, a segmentation module configured for segmenting at least one of the first or second images into at least one region, and a filter configured for filtering the disparity map based on the segmented regions.

According to a further aspect of the present disclosure, a program storage device readable by a machine, tangibly embodying a program of instructions executable by the machine to perform method steps for extracting depth information from at least two images is provided, the method including acquiring a first image and a second image from a scene, estimating the disparity of at least one point in the first image with at least one corresponding point in the second image to generate a disparity map, segmenting at least one of the first or second images into at least one region, and filtering the disparity map based on the segmented regions.

BRIEF DESCRIPTION OF THE DRAWINGS

These, and other aspects, features and advantages of the present disclosure will be described or become apparent from the following detailed description of the preferred embodiments, which is to be read in connection with the accompanying drawings.

In the drawings, wherein like reference numerals denote similar elements throughout the views:

FIG. 5 illustrates resultant images processed according to a system and method of the present disclosure, where

Figure 1:
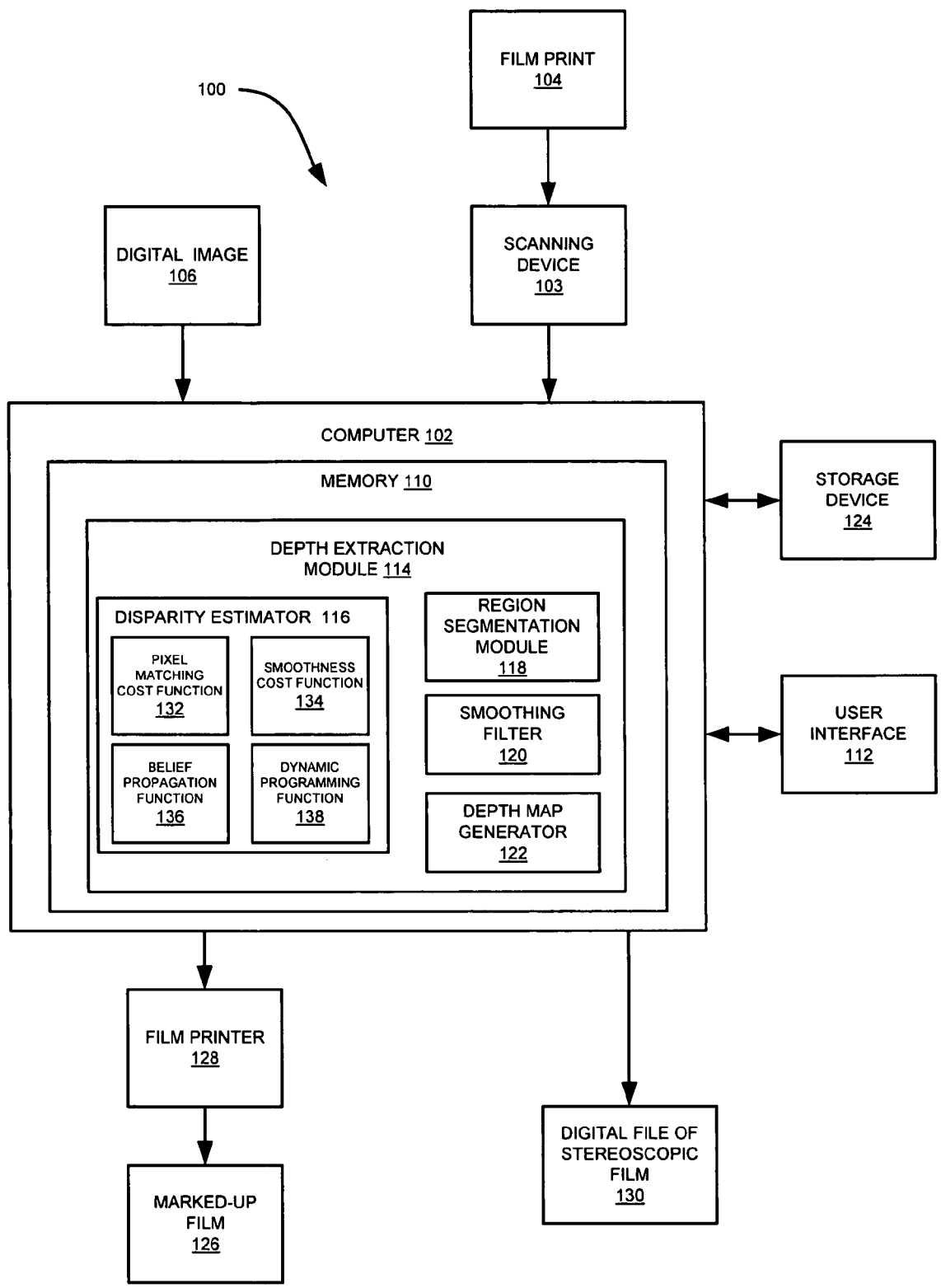
FIG. 1 is an exemplary illustration of a system for extracting depth information from at least two images according to an aspect of the present disclosure.

It should be understood that the drawing(s) is for purposes of illustrating the concepts of the disclosure and is not necessarily the only possible configuration for illustrating the disclosure.

DETAILED DESCRIPTION OF PREFERRED EMBODIMENTS

It should be understood that the elements shown in the FIGS. may be implemented in various forms of hardware, software or combinations thereof. Preferably, these elements are implemented in a combination of hardware and software on one or more appropriately programmed general-purpose devices, which may include a processor, memory and input/output interfaces.

The present description illustrates the principles of the present disclosure. It will thus be appreciated that those skilled in the art will be able to devise various arrangements that, although not explicitly described or shown herein, embody the principles of the disclosure and are included within its spirit and scope.

All examples and conditional language recited herein are intended for pedagogical purposes to aid the reader in understanding the principles of the disclosure and the concepts contributed by the inventor to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the disclosure. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read only memory ("ROM") for storing software, random access memory ("RAM"), and nonvolatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The disclosure as defined by such claims resides in the fact that the functionalities provided by the various recited means are combined and brought together in the manner which the claims call for. It is thus regarded that any means that can provide those functionalities are equivalent to those shown herein.

Stereo matching is a standard methodology for inferring a depth map from stereoscopic images, e.g., a left eye view image and right eye view image. 3D playback on conventional autostereoscopic displays has shown that the smoothness of the depth map significantly affects the look of the resulting 3D playback. Non-smooth depth maps often result in zig-zagging edges in 3D playback, which are visually worse than the playback of a smooth depth map with less accurate depth values. Therefore, the smoothness of a depth map is more important than the depth accuracy for 3D display and playback applications. Furthermore, global optimization based approaches are necessary for depth estimation in 3D display applications.

For depth estimation from stereoscopic images, it's also important to achieve a balance between computational cost and depth map accuracy. The present disclosure deals with this problem using a region-based filtering post-processing step after performing a scanline optimization algorithm or function (e.g. scanline dynamic programming or scanline belief propagation), where both methods are low-cost algorithms or functions.

The system and method of the present disclosure applies region-based filtering after scanline algorithms or functions. Scanline algorithms estimate the depth values between two images one scanline at a time. Typically, a smoothness constraint is only imposed along the horizontal direction. After the scanline algorithm or function is performed, a depth map results which may show stripe artifacts due to the lack of smoothness constraints along the vertical directions (see FIG. 5B). The system and method of the present disclosure applies a region-based smoothing algorithm or function to reduce the stripe artifacts while still roughly preserving the region boundaries.

The system and method further generates a disparity map from the estimated disparity for each of at least one point in the first image with the at least one corresponding point in the second image and converts the disparity map into a depth map by inverting the disparity values of the disparity map. The depth map or disparity map can then be utilized with stereoscopic image pair for 3D playback.

Referring now to the Figures, exemplary system components according to an embodiment of the present disclosure are shown in FIG. 1. A scanning device 103 may be provided for scanning film prints 104, e.g., camera-original film negatives, into a digital format, e.g. Cineon-format or Society of Motion Picture and Television Engineers ("SMPTE") Digital Picture Exchange ("DPX") files. The scanning device 103 may comprise, e.g., a telecine or any device that will generate a video output from film such as, e.g., an Arri LocPro™ with video output. Alternatively, files from the post production process or digital cinema 106 (e.g., files already in computer-readable form) can be used directly. Potential sources of computer-readable files are AVID™ editors, DPX files, D5 tapes etc.

Scanned film prints are input to a post-processing device 102, e.g., a computer. The computer is implemented on any of the various known computer platforms having hardware such as one or more central processing units (CPU), memory 110 such as random access memory (RAM) and/or read only memory (ROM) and input/output (I/O) user interface(s) 112 such as a keyboard, cursor control device (e.g., a mouse or joystick) and display device. The computer platform also includes an operating system and micro instruction code. The various processes and functions described herein may either be part of the micro instruction code or part of a software application program (or a combination thereof) which is executed via the operating system. In one embodiment, the software application program is tangibly embodied on a program storage device, which may be uploaded to and executed by any suitable machine such as post-processing device 102. In addition, various other peripheral devices may be connected to the computer platform by various interfaces and bus structures, such a parallel port, serial port or universal serial bus (USB). Other peripheral devices may include additional storage devices 124 and a printer 128. The printer 128 may be employed for printed a revised version of the film 126, e.g., a stereoscopic version of the film, wherein a scene or a plurality of scenes may have been altered or replaced using 3D modeled objects as a result of the techniques described below.

Alternatively, files/film prints already in computer-readable form 106 (e.g., digital cinema, which for example, may be stored on external hard drive 124) may be directly input into the computer 102. Note that the term "film" used herein may refer to either film prints or digital cinema.

A software program includes a depth extraction module 114 stored in the memory 110 for extracting depth information from at least two images. The depth extraction module 114 further includes a disparity estimator 116 configured for estimating the disparity of the at least one point in the first image with the at least one corresponding point in the second image (e.g., a stereoscopic pair) and for generating a disparity map from the estimated disparity for each of the at least one point in the first image with the at least one corresponding point in the second image. The disparity estimator 116 includes a pixel matching cost function 132 configured to match pixels in the first and second images and a smoothness cost function 134 to apply a smoothness constraint to the disparity estimation. The disparity estimator 116 further includes a belief propagation algorithm or function 136 and/or a dynamic programming algorithm or function 138 to minimize the pixel matching cost function and the smoothness cost function to achieve the optimal disparity between the two images. It is to be appreciated that any known optimization algorithm or function may be employed for minimizing the cost functions and Belief Propagation or Dynamic Programming are just two examples of exemplary optimization functions.

A region segmentation module 118 is provided for segmenting regions or objects from 2D images. A smoothing filter 120 is provided for filtering the pixels within a segmented region of the disparity map. In one embodiment, the smoothing filter 120 will discretize a Gaussian function to generate filter kernels for horizontal and vertical filtering. The degree of smoothness of the filtering can be controlled by adjusting the variance of the Gaussian function. It is to be appreciated that other functions, such as a box function, may be used to generate the filter kernels.

The depth extraction module 114 further includes a depth map generator 122 for converting the disparity map into a depth map by inverting the disparity values of the disparity map.

Figure 2:
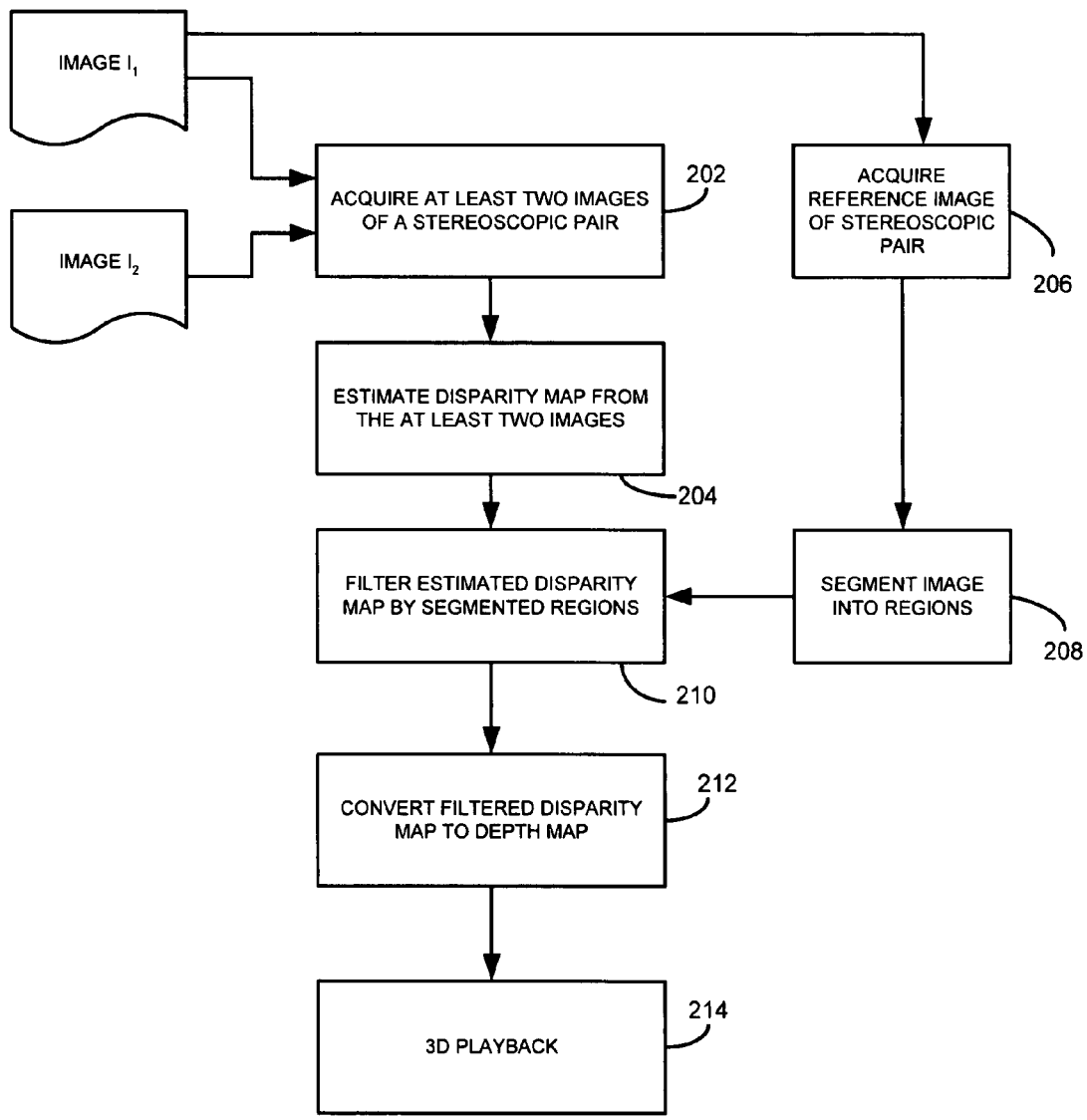
FIG. 2 is a flow diagram of an exemplary method for extracting depth information from at least two images according to an aspect of the present disclosure.

FIG. 2 is a flow diagram of an exemplary method for extracting depth information from at least two two-dimensional (2D) images according to an aspect of the present disclosure. Initially, the post-processing device 102 acquires at least two 2D images, e.g., a stereo image pair with left and right eye views (step 202). The post-processing device 102 may acquire the at least two 2D images by obtaining the digital master image file in a computer-readable format. The digital video file may be acquired by capturing a temporal sequence of moving images with a digital camera. Alternatively, the video sequence may be captured by a conventional film-type camera. In this scenario, the film is scanned via scanning device 103.

It is to be appreciated that whether the film is scanned or already in digital format, the digital file of the film will include indications or information on locations of the frames, e.g., a frame number, time from start of the film, etc. Each frame of the digital image file will include one image, e.g., $I_1$, $I_2$, ... $I_n$.

Stereoscopic images can be taken by two cameras with the same settings. Either the cameras are calibrated to have the same focal length, focal height and parallel focal plane; or the images have to be, warped based on known camera parameters as if they were taken by the cameras with parallel focal planes. This warping process includes camera calibration and camera rectification. The calibration and rectification process adjust the epipolar lines of the stereoscopic images so that the epipolar lines are exactly the horizontal scanlines of the images. Since corresponding point finding happens along the epipolar lines, the rectification process simplifies the correspondence search to searching only along the scanlines, which greatly reduces the computational cost. Corresponding points are pixels in images that correspond to the same scene point.

Next, in step 204, the disparity map is estimated for every point in the scene via disparity estimator 116. The disparity for every scene point is calculated as the relative distance of the matched points in the left and right eye images. For example, if the horizontal coordinate of a point in the left eye image is x, and the horizontal coordinate of its corresponding point in the right eye image is x', then the disparity d=x'−x. Subsequently, the disparity value d for a scene point is converted into depth value z, the distance from the scene point to the camera, using the following formula: z=Bf/d, where B is the distance between the two cameras, also called baseline, and f is the focal length of the camera, the details of which will be described below.

The idea of all stereo matching algorithms is to match the pixels in the left-eye image and those in the right-eye image. However, for a rectified picture pair, the displacement of the matched pixels only occurs in the horizontal direction. Therefore, only the pixels along the horizontal direction need to be searched. In stereo matching algorithms or functions, smoothness constraints are usually imposed, so that the areas in the image without texture can obtain their depth values from the pixels in the vicinity with textures. The smoothness constraints together with pixel matching can be combined together as a cost function as the following $$Cost(D)=MatchCost(D)+\lambda \cdot SmoothCost(D) \quad (1)$$

where D is the depth map (or disparity map), MatchCost is the total cost of pixel matching according to the depth map, SmoothCost is the total cost of the smoothness of neighboring pixels and λ is a factor used to weight the importance of the matching cost and smoothness cost.

The depth estimation problem therefore is to minimize the above cost function with respect to the depth map. If D is defined on the entire 2D image plane, then it is a 2D optimization problem, which involves intensive computation and entails high computational costs. Due to the nature of the rectified stereoscopic image pair, the above cost function can be defined on each image scan line, and the cost function on each scan line can be minimized. Therefore the 2D optimization problem is converted into multiple one-dimensional optimization problems that can be solved efficiently. Dynamic programming function 138 is an exemplary algorithm or function used to efficiently find the minimal solution of the above cost function, and Belief Propagation function 136 can be also modified to the 1D version for the same purpose. However, the main problem of scanline optimization is the "stripe" artifacts (see FIG. 5B) due to the lack of vertical smoothness constraints. The "stripe" artifacts result in annoying uttering when the depth map is played back together with the 2D image on the 2D+depth 3D displays.

To reduce the artifacts, the system and method of the present disclosure apply a smoothing filter to the resultant disparity map. However, the smoothing filter usually also blurs the depth boundary of the objects in the disparity map, which is undesirable. The system and method of the present disclosure constrain the smoothing process within the regions. Since the disparity discontinuities in most cases happen along the vertical direction, a smoothing filter is employed that is much stronger in the vertical direction than the horizontal direction, i.e., an anisotropic filter. This can be achieved by adjusting the variance of the Gaussian function of filter 120. Higher variance results in a stronger smoothing filter. To speed up the filtering process, the filters can be separable filters, which are realized by horizontal 1D filtering followed by vertical 1D filtering. For example, filtering in the horizontal direction is performed by a Gaussian function with a first variance and the filtering in the vertical direction is performed by a Gaussian function with a second variance, wherein the second variance is greater than the first variance; this will result in a greater smoothing effect in the vertical direction than in the horizontal direction. In one exemplary embodiment, for an image size of 960×540, the variance of the horizontal filter may be 2.0 and the variance of the vertical filter may be 4.0.

To perform the region-based filtering, at least one image of the stereoscopic pair is segmented into at least one region. Referring back to FIG. 2, in step 206, a reference image, e.g., the left eye view image, of the stereoscopic pair is acquired. Typically, the left eye view image is the reference image but the right eye view image may be employed in other embodiments. In step 208, the image is segmented into regions via region segmentation module 118. Region segmentation can be realized by any conventional region segmentation algorithm or function that can partition the image into non-overlapping regions. An exemplary region-detection algorithm or function is known as the mean-shift algorithm. The advantage of the mean-shift algorithm or function is that the number of regions does not need to be specified beforehand. Namely, the algorithm is able to automatically discover the number of regions during the segmentation process. One example of the region segmentation results is shown in FIG. 5C.

Once the regions of the image are determined, the disparity map is filtered via the smoothing filter 120 based on the regions in the image, step 210. The method for filtering the disparity map based on the segmented regions will be described in relation to FIGS. 3 and 4.

Figure 3:
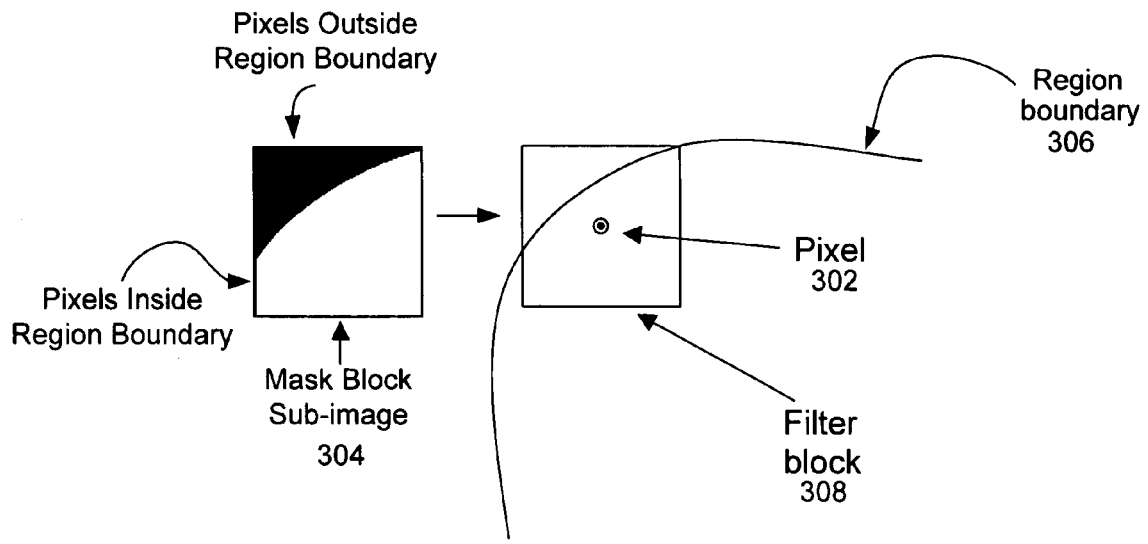
FIG. 3 illustrates region-based smoothing or filtering at each pixel of a disparity map in according to an aspect of the present disclosure.
Figure 4:
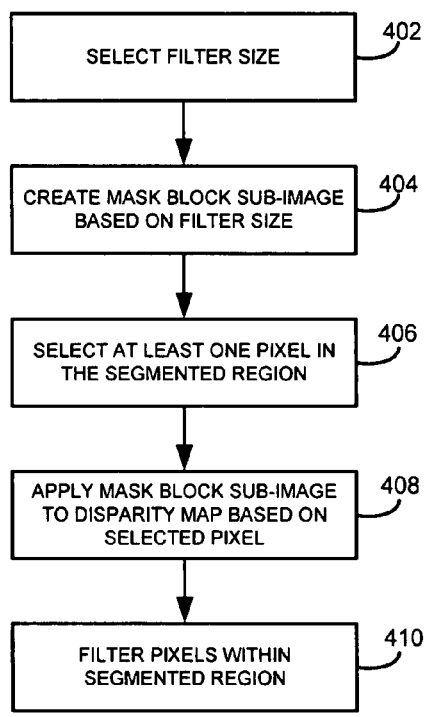
FIG. 4 is a flow diagram of an exemplary method for filtering regions of a disparity map according to an aspect of the present disclosure.

In the region-based smoothing scheme, for each pixel 302 in the region, a mask block sub-image 304 is generated whose pixels are neighborhood of the specified pixel. The size of the block is determined by the size of the filter. Therefore, initially in step 402, a filter size is selected. In step 404, the mask block sub-image 304 is created based on the filter size 308. For instance, if the horizontal filter tap is 6, and vertical filter tap is 4, the block is a rectangle with 4×6=24 pixels. In step 406, at least one pixel is selected in at least one segmented region and the mask block sub-image then is created on this block, in step 408. When the mask block sub-image is applied to the disparity map, the intensity value of a pixel is set to 1 if the pixel is within or inside the region boundary 306; otherwise, the intensity value of the pixel is set to 0 in the pixel is outside the region boundary, as shown in FIG. 3.

The filtering process is then realized by first applying the horizontal filter then being followed by the vertical filter, in step 410. Both vertical and horizontal filtering is weighed by the intensity value of the mask block sub-image, such that the pixel outside the region boundary 306 has no effect on the resulting smoothed disparity value. Different forms of the horizontal and vertical filters can be used. In one embodiment, Gaussian filters are used. The filters are generated by sampling a 1D Gaussian function with a predetermined variance and truncated to the specified filter tap. To preserve more details, the variance of the vertical filter is much higher than that of the horizontal filter, therefore it smoothes in the vertical direction more aggressively. The variances of the Gaussian functions are determined empirically, and can be input parameters of the whole system. For example, for an image size of 960×540, the variance of the horizontal filter may be 2.0 and the variance of the vertical filter may be 4.0.

Referring back to FIG. 2, in step 212, the filtered disparity map is converted into a depth map via the depth map generator 122. The disparity value d for each scene point is converted into depth value z, the distance from the scene point to the camera, using the following formula: z=Bf/d, where B is the distance between the two cameras, also called baseline, and f is the focal length of the camera. The depth values for each at least one image, e.g., the left eye view image, are stored in a depth map. The corresponding image and associated depth map are stored, e.g., in storage device 124, and may be retrieved for 3D playback (step 214). Furthermore, all images of a motion picture or video clip can be stored with the associated depth maps in a single digital file 130 representing a stereoscopic version of the motion picture or clip. The digital file 130 may be stored in storage device 124 for later retrieval, e.g., to print a stereoscopic version of the original film.

Figure 5A:
FIG. 5A illustrates a two-dimensional (2D) input image.
Figure 5B:
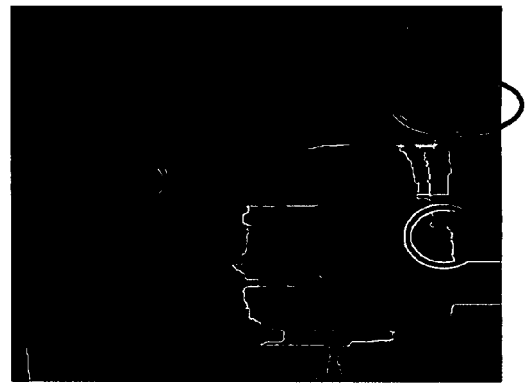
FIG. 5B is a resultant depth map processed by conventional scanline dynamic programming showing stripe artifacts.
Figure 5C:
FIG. 5C is a resultant region segmentation image of the image shown in FIG. 5A
Figure 5D:
FIG. 5D illustrates a smoothed depth map processed in accordance with the system and method of the present disclosure.

Images processed by the system and method of the present disclosure are illustrated in FIGS. 5A and 5C-5D, where FIG. 5A illustrates a two-dimensional (2D) input image. FIG. 5B is a resultant depth map processed by conventional scanline dynamic programming showing stripe artifacts. FIG. 5C is a resultant region segmentation image of the image shown in FIG. 5A and FIG. 5D illustrates a smoothed depth map processed in accordance with the system and method of the present disclosure where filtering is performed based on the regions segmented in FIG. 5C. Comparing the depth maps of FIGS. 5B and 5D, the system and method of the present disclosure effectively blurs the stripe artifacts while still largely preserving the depth boundaries between objects as shown in FIG. 5D.

Although embodiments which incorporate the teachings of the present disclosure have been shown and described in detail herein, those skilled in the art can readily devise many other varied embodiments that still incorporate these teachings. Having described preferred embodiments for a system and method for extracting depth information from at least two images (which are intended to be illustrative and not limiting), it is noted that modifications and variations can be made by persons skilled in the art in light of the above teachings. It is therefore to be understood that changes may be made in the particular embodiments of the disclosure disclosed which are within the scope of the disclosure as outlined by the appended claims.

What is claimed is:

1. A method of extracting depth information from at least two images in a computer, the method comprising:
   acquiring a first image and a second image from a scene;
   estimating the disparity of at least one point in the first image with at least one corresponding point in the second image to generate a disparity map;
   segmenting at least one of the first or second images into at least one region;
   filtering the disparity map in the horizontal direction and the vertical direction based on the segmented regions, the filtering in the vertical direction configured to have a greater smoothing effect than filtering in the horizontal direction; and converting the filtered disparity map into a depth map by inverting the estimated disparity for each of the at least one point of the disparity map.

2. The method as in claim 1, wherein the first and second images include a left eye view and a right eye view of a stereoscopic pair.

3. The method as in claim 1, wherein the estimating the disparity step includes computing at least one of a pixel matching cost function and a smoothness cost function.

4. The method as in claim 1, wherein the estimating the disparity step is performed by a scanline optimization function.

5. The method as in claim 1, wherein the filtering in the horizontal direction is performed by a Gaussian function with a first variance and the filtering in the vertical direction is performed by a Gaussian function with a second variance, wherein the second variance is greater than the first variance.

6. The method as in claim 1, wherein the filtering step includes:
   selecting a filter size;
   creating a mask block sub-image based on the filter size to mask pixels outside the at least one segmented region; and
   filtering at least one pixel inside the at least one segmented region.

7. A system for extracting depth information from at least two images comprising:
   means for acquiring a first image and a second image from a scene;
   a disparity estimator configured for estimating the disparity of at least one point in the first image with at least one corresponding point in the second image to generate a disparity map;
   a segmentation module configured for segmenting at least one of the first or second images into at least one region;
   a filter configured for filtering the disparity map in the horizontal direction and the vertical direction based on the segmented regions the filtering in the vertical direction configured to have a greater smoothing effect than filtering in the horizontal direction; and
   a depth map generator configured for converting the filtered disparity map into a depth map by inverting the estimated disparity for each of the at least one point of the disparity map.

8. The system of claim 7, wherein the first and second images include a left eye view and a right eye view of a stereoscopic pair.

9. The system as in claim 7, wherein the disparity estimator includes at least one of a pixel matching cost function, a smoothness cost function, and a scanline optimization function.

10. The system as is in claim 7, wherein the horizontal filter is generated by a Gaussian function with a first variance and the vertical filter is generated by a Gaussian function with a second variance, wherein the second variance is greater than the first variance.

11. The system as in claim 7, wherein the filter is further configured for creating a mask block sub-image based on a predetermined filter size to mask pixels outside the at least one segmented region and to filter at least one pixel inside the at least one segmented region.

12. A program storage device readable by a machine, storing a program of instructions executable by the machine, the program causing the machine to perform method steps for extracting depth information from at least two images, the method comprising:
   acquiring a first image and a second image from a scene;
   estimating the disparity of at least one point in the first image with at least one corresponding point in the second image to generate a disparity map;
   segmenting at least one of the first or second images into at least one region;

filtering the disparity map in the horizontal direction and the vertical direction based on the segmented regions, the filtering in the vertical direction configured to have a greater smoothing effect than filtering in the horizontal direction; and converting the filtered disparity map into a depth map by inverting the estimated disparity for each of the at least one point of the disparity map.

* * * * *